Figure 1:
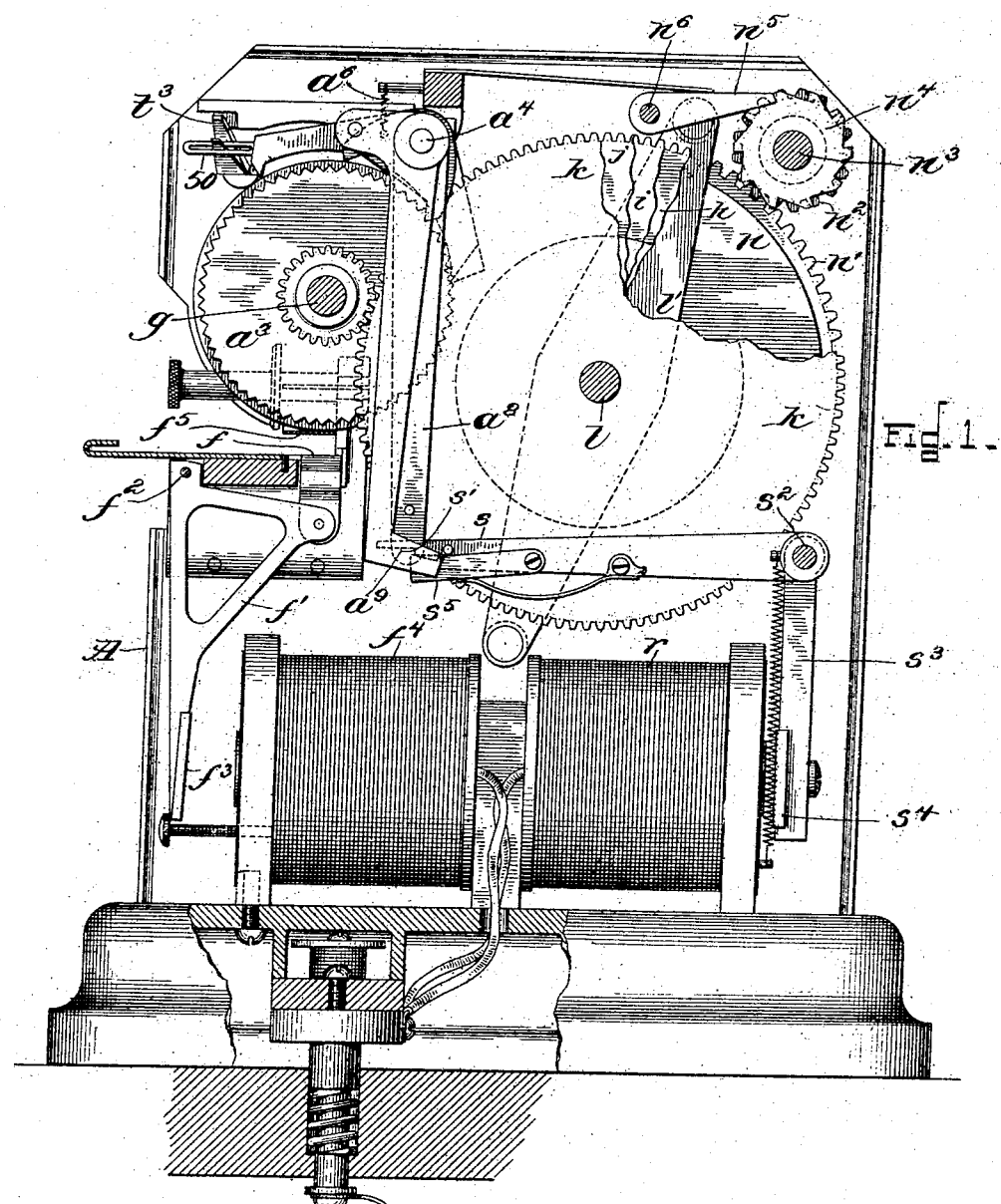

No. 646,013. Patented Mar. 27, 1900.
N. H. SUREN.
AUTOMATIC TIME STAMP.
(Application filed July 17, 1897.)
(No Model.) 6 Sheets—Sheet 1.

Witnesses
Arthur F. Randall
Mary E. Foster

Inventor
Nathan H. Suren
by B. J. Noyes, atty.

No. 646,013. Patented Mar. 27, 1900.
N. H. SUREN.
AUTOMATIC TIME STAMP.
(Application filed July 17, 1897.)
(No Model.) 6 Sheets—Sheet 3.

Witnesses

Inventor
Nathan H. Suren

No. 646,013. Patented Mar. 27, 1900.
N. H. SUREN.
AUTOMATIC TIME STAMP.
(Application filed July 17, 1897.)
(No Model.) 6 Sheets—Sheet 4.
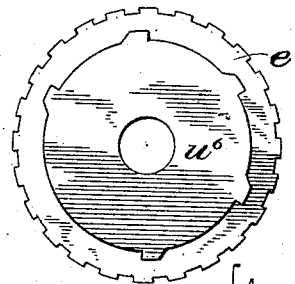
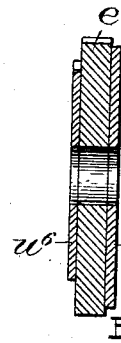
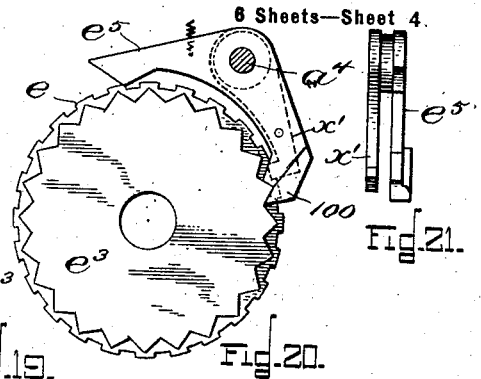
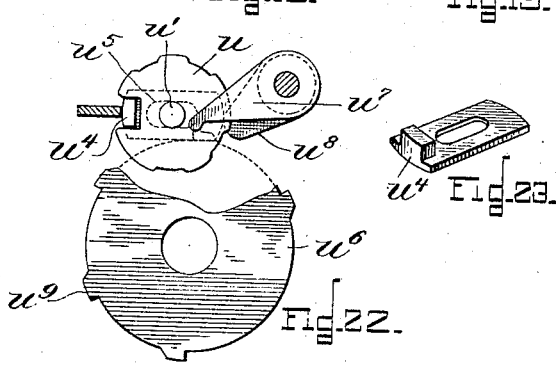
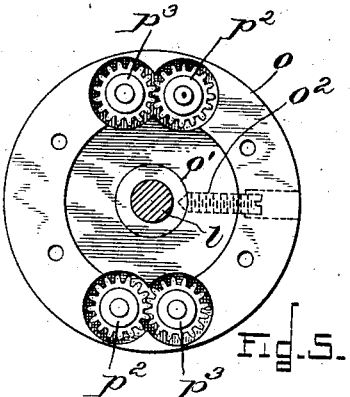
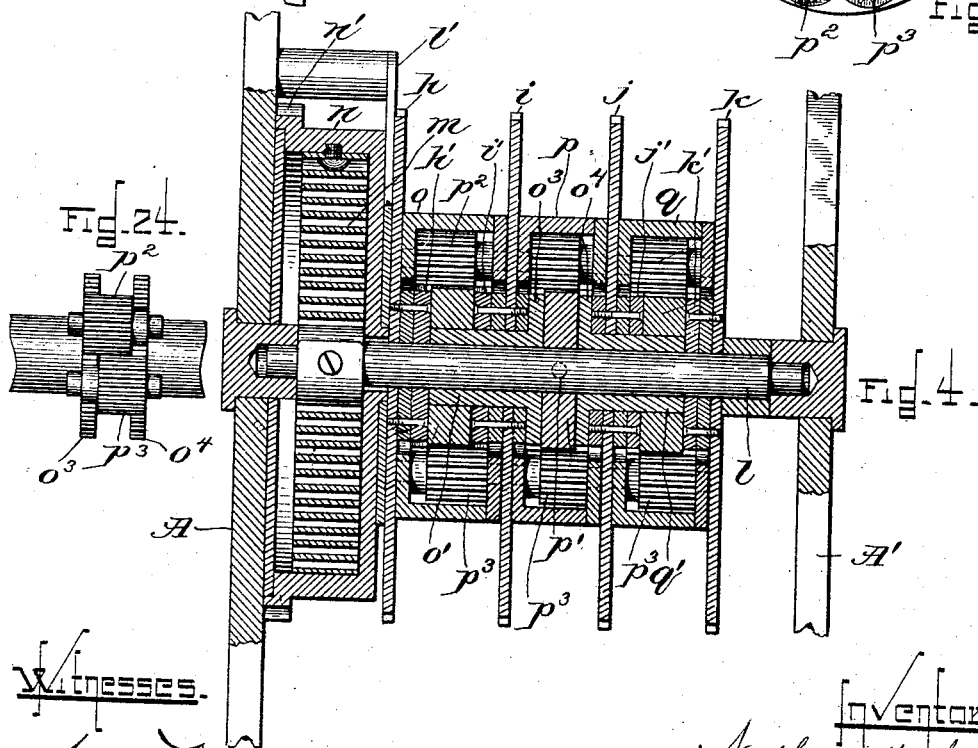
Witnesses.
Arthur T. Randall
Mary E. Foster
Inventor.
Nathan H. Suren
By B. J. Noyes, atty.

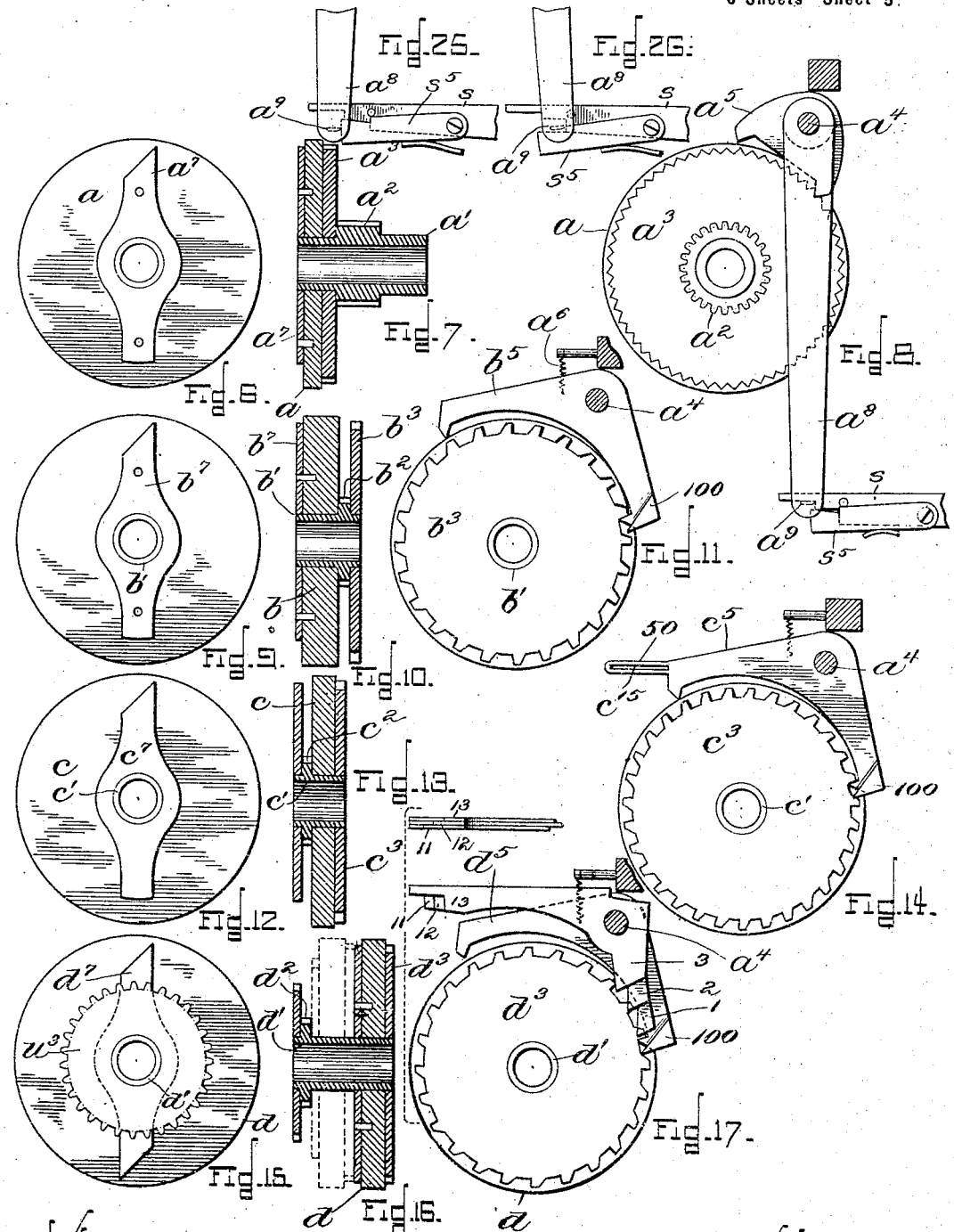

No. 646,013. Patented Mar. 27, 1900.
N. H. SUREN.
AUTOMATIC TIME STAMP.
(Application filed July 17, 1897.)
(No Model.) 6 Sheets—Sheet 6.
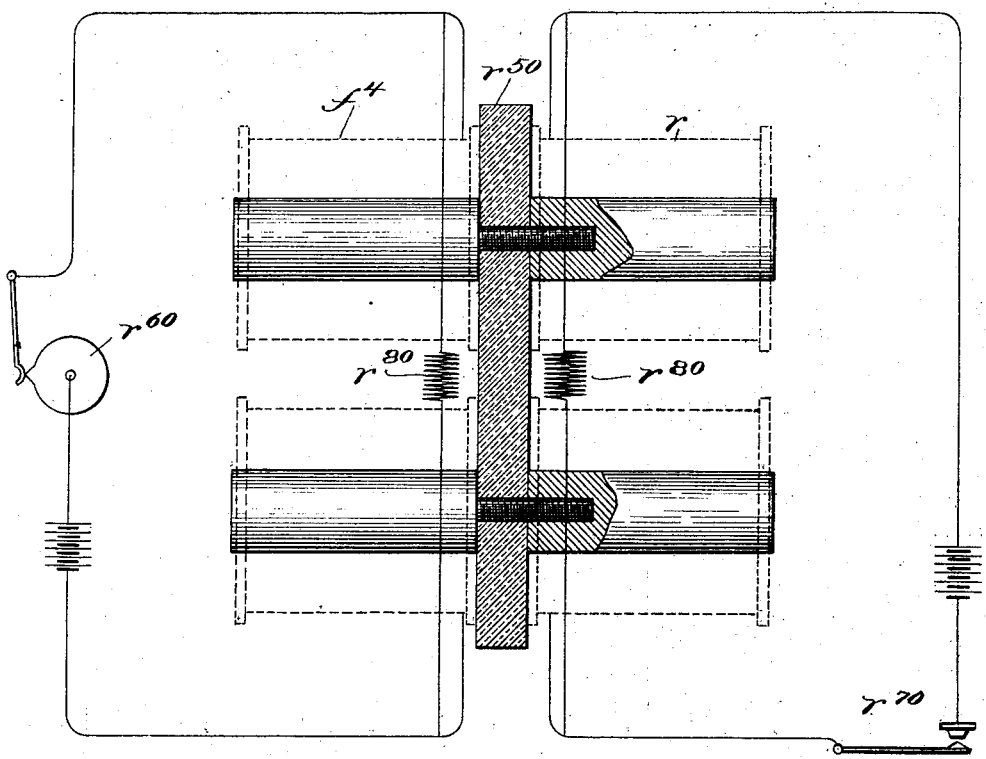
Fig. 28.
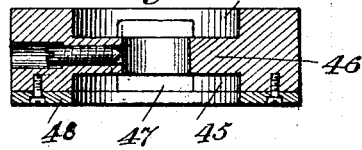
Fig. 5.ª
Witnesses: Inventor:
Nathan H. Suren

UNITED STATES PATENT OFFICE.

NATHAN H. SUREN, OF NEWTON, MASSACHUSETTS, ASSIGNOR TO THE GAMEWELL FIRE-ALARM TELEGRAPH COMPANY, OF NEW YORK, N. Y.

AUTOMATIC TIME-STAMP.

SPECIFICATION forming part of Letters Patent No. 646,013, dated March 27, 1900.

Application filed July 17, 1897. Serial No. 644,939. (No model.)

*To all whom it may concern:*

Be it known that I, NATHAN H. SUREN, of Newton, State of Massachusetts, have invented an Improvement in Automatic Time-Stamps, of which the following description, in connection with the accompanying drawings, is a specification, like letters and figures on the drawings representing like parts.

My invention has for its object to improve the construction of time and date printing stamps, more commonly called "time-stamps," to the end that all the date-printing wheels, as well as the time-printing wheels, may be automatically operated, thereby obviating the necessity of setting said date-printing wheels, as is now customary in many time-stamps.

The invention also has for its object to provide a novel and compact form of actuating means for the time and date printing wheels, whereby a single actuating-spring may be employed for all of said wheels.

The invention consists in a time-stamp embodying the following features: first, means for automatically operating the date-printing wheels, as well as the time-printing wheels; second, means for operating the minute-printing wheel step by step and for operating the other time-printing wheel and all the date-printing wheels by or through the medium of said minute-printing wheel; third, means for automatically controlling the day-printing wheel to provide for variations in the number of days for all the different months of the year; fourth, means for further automatically controlling said day-printing wheel to provide for the number of days occurring in the month of February in leap-years as contrasted with other years and also in the month of February in century years that are not leap-years; fifth, a spring which serves as the actuator for all the time and date printing wheels; sixth, a spring-impelled shaft and means operatively connecting the time and date printing wheels with said shaft, whereby the power of the spring is transmitted to the series of printing-wheels in a manner to permit of an equal distribution of the power to all the wheels whether operating singly or together, and, seventh, a spring which serves as the actuator for all the time and date printing wheels and a single escape-wheel for said spring, a pallet for said escape-wheel, and a let-off or releasing device for said pallet which is periodically operated.

Other features of my invention are hereinafter particularly set forth in the following description.

Figure 2:
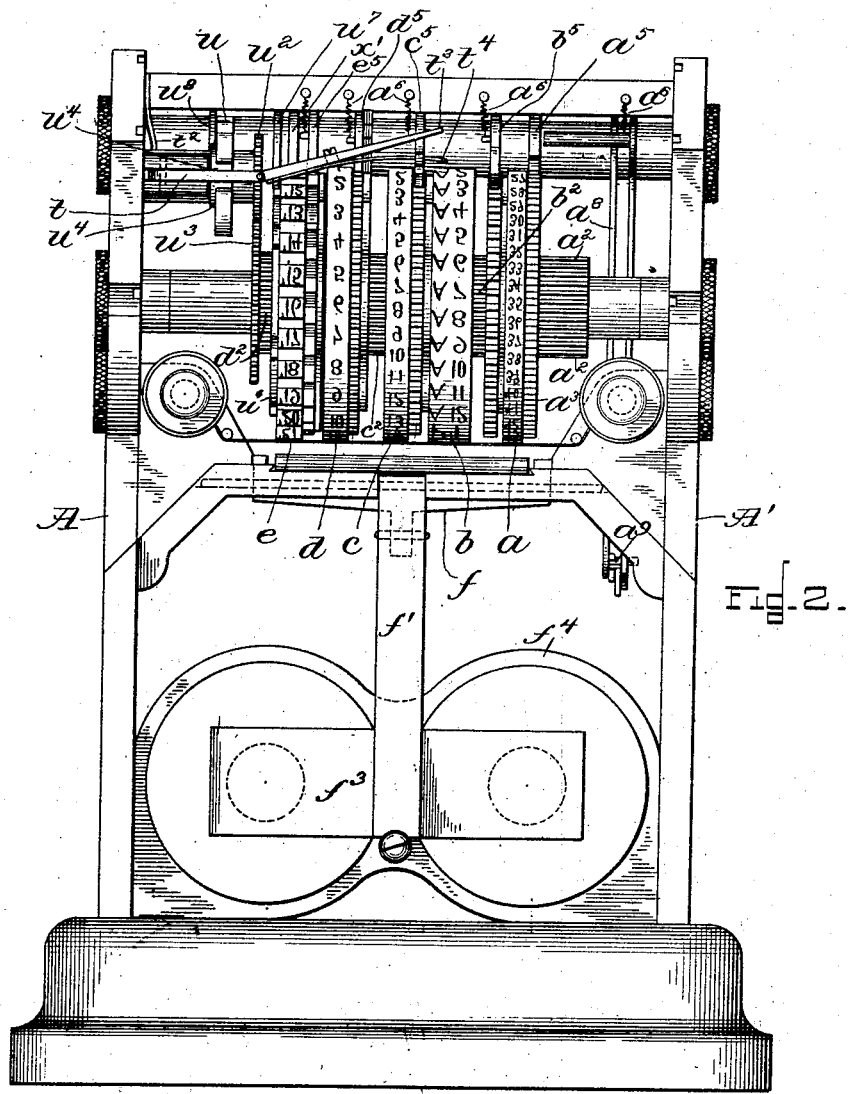
Figure 3:
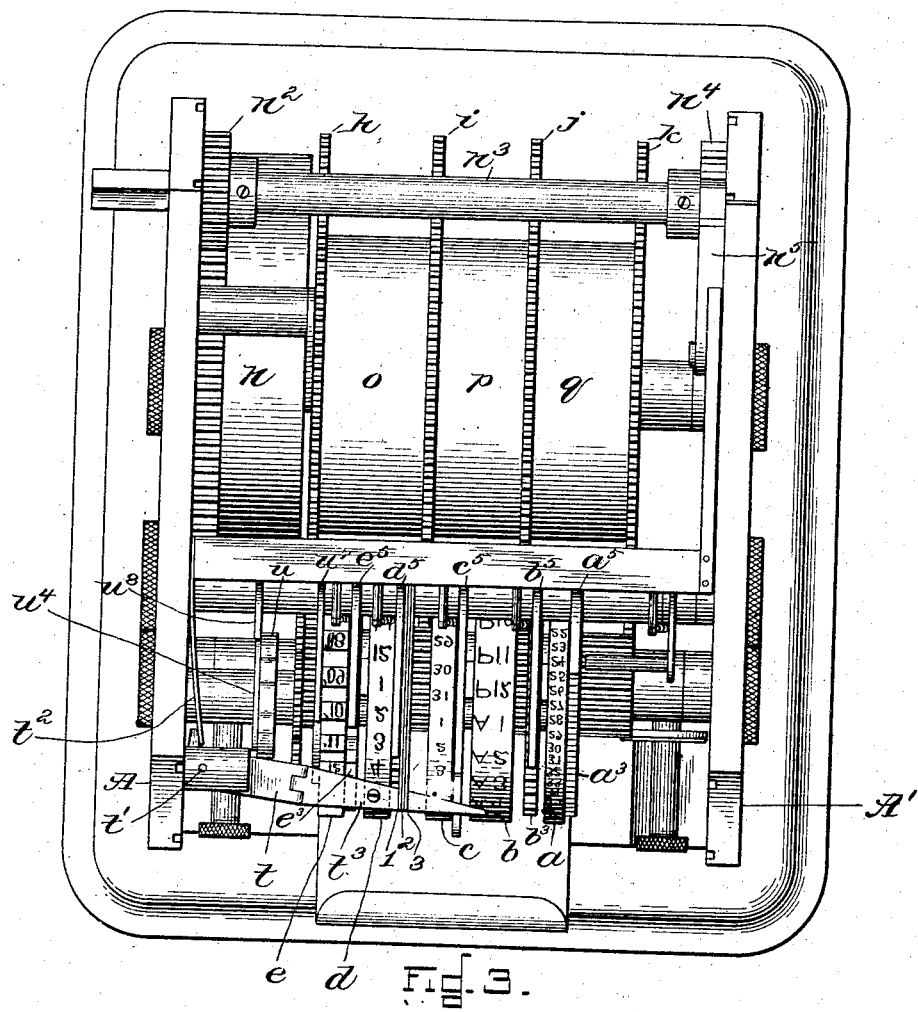

Figure 1 shows in side elevation a time-stamp embodying my invention in which portions of the framework thereof are removed for clearness. Fig. 2 is a front elevation of the time-stamp shown in Fig. 1. Fig. 3 is a plan view of the time-stamp shown in Fig. 1. Fig. 4 is a sectional detail of the spring-impelled shaft hereinafter referred to and the adjoining parts, the carriers on said shaft being shown in vertical section. Fig. 5 is a side view of one of the carriers shown in section in Fig. 4, one of its face-plates being removed. Fig. 5ª is a horizontal section of one of the carriers. Figs. 6 to 16, inclusive, are details of the time and date printing wheels and adjacent parts to be referred to. Fig. 17 is a detail of the parts provided for changing the number of characters which the day-wheel will present for the different months. Figs. 18, 19, 20, 21, and 22 show details of the year-printing wheel and its coöperating parts; Fig. 23, a detail of the controlling device for the month of February; Fig. 24, a detail showing one pair of planet-gears contained in one of the carriers; Figs. 25 and 26, details showing two positions of the releasing device for the minute-wheel. Fig. 27 is a section of the printed strip of paper; Fig. 28, a detail showing the electromagnets for releasing the type-wheels and for operating the platen.

In the time-stamp hereinafter described the printing operation is designed to be effected in the usual manner—as, for instance, by the operation of an electromagnet—and the said electromagnet may, for example, be arranged to be operated conjunctively with or by an ordinary Morse register or recorder, included in or forming a part of an electric signal system, so that upon the reception of a "call" the time-stamp will be automatically operated to print upon a strip of paper the exact time and date at which the call is received.

The printing mechanism comprises a vertically-movable platen or presser *f*, connected to and operated by a lever $f'$, pivoted at $f^2$ to the frame of the machine, and carrying an armature $f^3$, which is operated by the electromagnet $f^4$. The platen $f^4$ when raised serves to press a strip of paper or the like up against a series or row of time and date printing wheels, there being herein shown a minute-wheel $a$, hour-wheel $b$, day-wheel $c$, month-wheel $d$, and year-wheel $e$, said wheels having upon their peripheries suitable time or date printing characters, as the case may be.

Any usual or suitable inking-strip $f^5$ is arranged between the printing-wheels and platen $f$.

The printing-wheels $a$, $b$, $c$, and $d$ (see Figs. 7, 10, 13, 16, and 19) are driven onto or otherwise secured, respectively, to short sleeves $a'$, $b'$, $c'$, and $d'$, and all of said sleeves are mounted loosely upon an arbor $g$, which is supported at its ends in the side plates A A' of the frame of the machine. The said sleeves $a'$, $b'$, $c'$, and $d'$ are respectively formed or provided with pinions $a^2$, $b^2$, and $d^2$, and four gears $h\ i\ j\ k$ are provided for driving said pinions, the gear $h$ engaging the pinion $d^2$, the gear $i$ engaging the pinion $c^2$, the gear $j$ engaging the pinion $b^2$, and the gear $k$ engaging the pinion $a^2$. The gears $h$ and $k$ are loosely mounted upon a shaft $l$, which is journaled in the side plates A A' of the machine, and the gears $i$ and $j$ are loosely mounted upon sleeves $o'\ q'$, which are in turn mounted loosely on said shaft $l$. The shaft $l$ (see Fig. 4) is rotated by means of a coiled spring $m$, arranged within a barrel $n$ at one end of the shaft, the inner end of said spring being secured to said shaft $l$ and the outer end to said barrel $n$, and said barrel $n$ is mounted loosely upon the said shaft $l$ and is suitably supported by, yet free to be revolved in, a bracket $l'$, which is attached to the inner face of one of the side plates. The barrel $n$ has formed upon its exterior gear-teeth $n'$, (see Figs. 1 and 3,) producing, as it were, a gear which is engaged by a pinion $n^2$, fixed upon a shaft $n^3$, also journaled in the side plates A A' and having fixed to it a ratchet-wheel $n^4$, which is engaged by a spring-pressed pawl $n^5$, pivoted at $n^6$ to the framework of the machine. One extremity of the shaft $n^3$ projects through the side plate A and is squared or otherwise adapted to receive upon it a key or the like, by means of which said shaft $n^3$, and consequently the barrel $n$, may be rotated to wind up the mainspring $m$. The mainspring $m$ has a constant tendency to turn the shaft $l$, and by mechanism to be described to rotate any or all of the driving-gears, and consequently to rotate the time and date printing wheels, and suitable pallets are provided for said time and date printing wheels, as will be hereinafter described, for restraining them from rotation except when released.

The driving-gears $h$, $i$, $j$, and $k$ each have secured to one side or face thereof, coincident with their axes, sun-gears $h'$, $i'$, $j'$, and $k'$, which are made very much smaller in diameter than the driving-gears to which they are attached, and, as shown in Fig. 4, the sun-gears $h'$ and $j'$ are secured to the right-hand sides or faces of the driving-gears $h$ and $j$, and the sun-gears $i'$ and $k'$ are secured to the left-hand sides or faces of the driving-gears $i$ and $k$. The driving-gears $h\ i\ j\ k$ are all disposed on the shaft $l$ at substantially-equal distances apart, and in the spaces between the said driving-gears the collars $o$, $p$, and $q$ are located, they being made of a width to substantially fill said spaces. The carriers $o$, $p$, and $q$ (see Figs. 5 and $5^a$) are made substantially alike, and each consists of a circular shell or case containing a number of pinions, as will be described. The circular shell or case is herein shown as made in two parts, one part comprising a circular disk formed with a circular recess 45 at each side or face, concentric to the axis of the disk, to thereby form a central hub 46, and said disk has also formed in it recesses 47 for the pinions. The other part of the shell or case consists of a flat ring of a shape and size corresponding to the shape and size of the disk and having a circular hole through it, corresponding in shape and size with the circular recess in the disk, and said flat ring 48 is secured to the disk and covers or incloses the recesses 47, which contain the pinions, and said flat ring serves as a bearing for one end of the shafts bearing the pinions. One of said carriers— as, for instance, the central carrier $p$—is secured directly to the spring-impelled shaft $l$ by means of a set-screw $p'$. The remaining carriers $o$ and $q$ (see Figs. 4 and 5) are secured, respectively, to the sleeves $o'$ and $q'$ by set-screws $o^2$, and said sleeves $o'\ q'$ are fitted loosely upon the shaft $l$ and extend from their respective carriers $o$ and $q$, to which they are secured, toward each other and through the two middle driving-gears $i$ and $j$ to the opposite sides of said gears, and at their inner or adjacent ends sun-gears $o^3$ and $o^4$ are formed or provided, which are located within but at opposite sides of the carrier $p$. One or more pairs of intermeshing planet-gears $p^2 p^3$ are contained in said carrier $p$ and loosely journaled therein, two pairs being herein shown, and the gears of each pair are offset relatively to each other, (see Fig. 24,) so that the planet-gear $p^2$ of each pair lies close to one side of the carrier and is engaged by the sun-gear $o^3$, and the planet-gear $p^3$ of each pair lies close to the other side of said carrier and is engaged by the sun-gear $o^4$. Each of the carriers $o$ and $q$, like the carrier $p$, has journaled therein one or more pairs of similar intermeshing and offset planet-gears $p^2\ p^3$. The planet-gears $p^2$, carried by the carrier $q$, engage the sun-gear $j'$, which is secured to the driving-gear $j$ and mounted loosely upon the sleeve $q'$, and the planet-gears $p^3$, carried by said carrier $q$, engage the sun-gear $k'$, fixed to the driving-gear $k$, which is placed loosely on said shaft $l$. The planet-gears $p^2$, carried by the carrier $o$, engage the sun-gear $h'$, fixed to the driving-gear $h$, which is placed loosely upon said shaft $l$, and the planet-gears $p^3$, carried by said carrier $o$, engage the sun-gear $i'$, which is fixed to the driving-gear $i$ and which is loosely mounted upon the sleeve $o'$. The spring-impelled shaft $l$ turns to drive any one or more of the driving-gears which may be released, and when thus permitted to rotate the carrier $p$, fixed thereto, turns in unison with it and carries the planet-gears $p^2$ and $p^3$ borne by it bodily around the sun-gears $o^3$ and $o^4$, and during such rotary movement of the carrier $p$ if one of said sun-gears $o^3$ or $o^4$ remain stationary the planet-gears which are in engagement with it will be revolved and in turn will revolve the planet-gears engaged by them to impart rotary movement to the other sun-gear. As, for example, if the sun-gear $o^4$ should remain at rest as the carrier $p$ revolves the planet-gears $p^3$, engaging said sun-gear $o^4$, will be revolved and will revolve the planet-gears $p^2$, which mesh therewith, and the latter will in turn impart rotary motion to the sun-gear $o^3$ and sleeve $o'$, carrying it, or, if the sun-gear $o^3$ should remain at rest as the carrier $p$ revolves, the planet-gears $p^2$, engaging said sun-gear $o^3$, will be revolved and will revolve the planet-gears $p^3$, which mesh therewith, and the latter will in turn impart rotary motion to the sun-gear $o^4$ and sleeve $q'$, carrying it. The sleeves $o'$ and $q'$ carry the carriers $o$ and $q$, and hence the power of the mainspring can thus be transmitted by the shaft $l$ and carrier $p$, fixed thereon, to either carrier $o$ or $q$, as required. The power transmitted to the carrier $o$ is employed to drive either or both of the gears $h$ and $i$, and the power transmitted to the carrier $q$ is employed to drive either or both of the gears $j$ and $k$. The power from the carrier $o$ is transmitted to the driving-gear $h$ in the following manner, viz: As said carrier $o$ rotates its planet-gears $p^3$ travel around the sun-gear $i'$, which at such time remains stationary, and are revolved and in turn revolve the planet-gears $p^2$, which engage and drive the sun-gear $h'$, fast to said driving-gear $h$, and the power from said carrier $o$ is transmitted to the driving-gear $i$ in the following manner, viz: As said carrier rotates its planet-gears $p^2$ travel around the sun-gear $h'$, which at such time remains stationary, and are revolved and in turn revolve the planet-gears $p^3$, which engage and drive the sun-gear $i'$, fast to said driving-gear $i$. When both the driving-gears $h$ and $i$ are released, so as to operate together, then the carrier $o$ and planet-gears $p^2$ and $p^3$, carried by it, and sun-gears $h'$ $i'$ will all revolve together without relative movement. The power from the carrier $q$ will be transmitted to the driving-gears $j$ and $k$ in the same manner as the power is transmitted from the carrier $o$ to the driving-gears $h$ and $i$, as above described, and said driving-gears will operate together also, as above described. When all of the driving-gears $h$, $i$, $j$, and $k$ are released, so as to operate together, then said gears and all the parts connected thereto will turn in unison with the shaft $l$ without relative movement. Thus it will be observed that the central carrier $p$ serves as a means of transmitting the power from the spring-impelled shaft $l$ to the carriers $o$ and $q$, that said carriers $o$ and $q$ serve as actuators of the driving-gears $h$, $i$, $j$, and $k$, and that the power of the spring $m$ will be transmitted in equal proportions to all of the driving-gears $h$, $i$, $j$, and $k$ while the said gears are held stationary or while they are operating.

The spring-actuated time and date printing wheels $a$, $b$, $c$, and $d$ are controlled by an escapement mechanism, which is in turn controlled by an electromagnet $r$, a change in the normal condition of which operates to momentarily release the escapement mechanism. The time and date printing wheels $a$, $b$, $c$, and $d$ each have secured to them at one side or face escape-wheels $a^3$ $b^3$ $c^3$ $d^3$, which are respectively engaged by pallet-toothed releasing devices $a^5$ $b^5$ $c^5$ $d^5$, which will be hereinafter referred to as "pallets," which are pivotally or loosely mounted upon a rod or bar $a^4$, that is supported by the frame of the machine. All of said pallet-toothed releasing devices or pallets, except $a^5$, are normally held in engagement with their escape-wheels by springs $a^6$, and said spring-pressed pallets serve to hold the printing-wheels at rest against the stress of the main actuating-spring $m$, except when they are operated to release said wheels. Each escape-wheel is notched to correspond with the number of time or date printing characters carried by its respective printing-wheel and will be rotated intermittingly or step by step as its pallet is vibrated.

The printing-wheels $a$ $b$ $c$ $d$ each have secured thereto at the opposite side or face from the escape-wheel a cam or projection $a^7$, $b^7$, $c^7$, and $d^7$, adapted to turn in unison therewith, and said cams project radially nearly to the periphery of said wheels, and the downwardly-projecting arms of the pallets $b^5$, $c^5$, and $d^5$ each have on one side a lateral projection 100, which lies in the path of engagement of the cam on the next adjacent wheel, and on every complete revolution of one of said printing-wheels, except the month-wheel, the cam thereon will engage and operate to rock the pallet of the printing-wheel next to it, and thereby release said adjacent printing-wheel and allow it to advance one step. For example, it will be seen that the cam $a^7$ of the minute-printing wheel $a$ operates to rock the pallet $b^5$ of the hour-printing wheel $b$ to advance said wheel $b$ one step for each complete revolution of said minute-printing wheel $a$, and the cam $b^7$ of the hour-printing wheel $b$ operates to rock the pallet $c^5$ of the day-printing wheel $c$ to advance said wheel $c$ one step for each complete revolution of said hour-printing wheel $b$, and so on for the series. The pallet $a^5$ of the minute-printing wheel $a$ has fixed to it a downwardly-projecting arm $a^8$, which is provided at its lower end with a laterally-projecting pin or stud $a^9$, which is engaged by the shouldered end $s'$, formed or provided on an arm $s$, secured to a rock-shaft $s^2$, journaled in the framework, which latter has secured to it a lever $s^3$, carrying the armature $s^4$ of an electromagnet $r$.

The upward movement of the arm $s$ incident to the armature moving toward or closing upon its poles lifts the shouldered end $s'$ above and out of the path of engagement of the stud $a^9$, thereby releasing the pallet-carrying arm $a^8$ and permitting it to be swung to the right, Fig. 1, which movement permits the pallet $a^5$ to rock, and thereby release its escape-wheel $a^3$, but, pallet-like, as one tooth of the pallet disengages the escape-wheel the other tooth thereof is brought into engagement with the escape-wheel, and the latter is thus allowed to advance half a tooth; but the stress of the main actuating-spring $m$ on the escape-wheel thus released causes said wheel to in return act upon the pallet which is in engagement therewith and to rock said pallet in the opposite way, and thereby cause its other tooth to return and engage the escape-wheel and to also return the pallet-carrying arm $a^8$ to its normal position, and as the pallet is thus rocked the escape-wheel will be allowed to advance another half a tooth. Thus on each complete vibration of the pallet the escape-wheel $a^3$ will advance a single step. When the arm $s$ is raised, the stud $a^9$ slips off of the shouldered end $s'$ thereof and, moving aside a spring-pressed finger $s^5$, pivoted to said arm $s$, will occupy a position between said spring-pressed finger and the arm, (see Fig. 26,) the spring-pressed finger being held at such time by the stud $a^9$ bearing upon it; but as the arm $a^8$ is immediately moved in the opposite direction before the arm $s$ resumes its normal position said stud $a^9$ will be withdrawn from between the finger $s^5$ and the arm, as shown in Fig. 25, permitting the finger $s^5$ to rise and resume its normal relative position to the arm, at which time the stud $a^9$ will be brought to bear against the end of said finger, and the parts will remain in such position until the arm $s$ resumes its normal position, as shown in Fig. 8, when the stud $a^9$ will slip off of the end of the finger $s^5$ and will again engage the shouldered end of the arm. Therefore it will be observed that but a single vibration of the arm $a^8$ is permitted for each complete vibration or excursion of the armature.

The electromagnet $r$ is energized at regular intervals of time—as, for instance, once every minute—and by the releasing device operated by it the escape-wheel, and consequently the minute-printing wheel $a$, will be advanced intermittingly or step by step, and by means of the cam $a^7$ on said minute-printing wheel $a$ the pallet of the hour-printing wheel $b$ will be operated to advance said hour-wheel one step on each complete revolution of the minute-printing wheel $a$, and so on for the entire series.

The day-printing wheel $c$ has on its periphery thirty-one printing characters, which are or may be brought successively into printing position for months having thirty-one days, and to automatically operate the day-printing wheel to provide for the variation in the number of days occurring in different months of the year I provide a bell-crank lever $t$, pivoted at $t'$ to a stud on the frame of the machine, and one arm of the said bell-crank lever is acted upon by a spring $t^2$, tending to move it in one direction, and the other arm of said bell-crank lever $t$ is acted upon by a rotatable cam $u$, tending to move it in the opposite direction. The bell-crank lever $t$ is provided with an extension $t^3$, pivoted to one arm thereof, which has attached to its under side one end of a leaf-spring $t^4$, the outer or free end of said spring projecting through a slot $c^{15}$, formed in an extension 50 on one arm of the pallet $c^5$ of the day-printing wheel $c$. The extension $t^3$ on the bell-crank lever $t$ is adapted to be moved by a rotatable cam $u$ into or out of coöperative relation with the ends of the arms of a set of bell-crank levers pivoted to or loosely mounted upon the cross-bar $a^4$, there being three such bell-crank levers 1, 2, and 3 herein shown.

The arms 11 12 13 of the three bell-crank levers 1, 2, and 3, which coöperate with the extension $t^3$, are each made of a different length, and they are arranged close together side by side, and being all mounted upon the same rod or bar their outer or free ends will terminate, respectively, at three different distances from said rod or bar, and the extension $t^3$ of the bell-crank lever $t$ may be brought into coöperative relation with one, two, or all of said arms, as will be described.

The bell-crank levers 1, 2, and 3 are disposed on the rod or bar $a^4$ opposite the cam $c^7$ of the day-printing wheel $c$ and are made quite thin and arranged close together, so that all of them may be engaged and operated by said cam $c^7$, and the arms of said bell-crank levers which are engaged by said cam $c^7$ are made of different lengths, so as to be engaged successively by said cam, and the variations in length being equal to the distances apart that the printing characters are disposed on the periphery of the day-printing wheel. The arms of said bell-crank levers 1, 2, and 3, which are engaged by the cam $c^7$, are so located relatively to the other parts that the cam $c^7$ will engage the lever 3 when the day-printing wheel $c$ is operated to move the twenty-eighth printing character out of printing position and to bring the twenty-ninth printing character into printing position and to engage the lever 2 when the day-printing wheel $c$ is operated to move the twenty-ninth printing character out of printing position and to bring the thirtieth printing character into printing position and to engage the lever 1 when the day-printing wheel $c$ is operated to move the thirtieth printing character out of printing position and to bring the thirty-first printing character into printing position.

It is designed and intended that the pallet $c^5$ of the day-printing wheel $c$ shall be vibrated by the cam $b^7$ on the hour-wheel $b$ once on each complete rotation of said hour-wheel $b$ and to thereby release and permit the advancement of said day-printing wheel $c$ step by step and that said pallet $c^5$ shall also be vibrated by the extension $t^3$ of the bell-crank lever $t$ in case less than thirty-one printing characters of said day-wheel $c$ are to be presented to printing position for use—as, for example, said extension $t^3$ shall vibrate said pallet $c^5$ once if thirty characters only are to be presented to printing position for use, twice if twenty-nine characters only are to be presented to printing position for use, and three times if twenty-eight printing characters only are to be presented to printing position for use—and it is furthermore designed and intended that the operation of said extension $t^3$ once, twice, or three times, as may be required, shall be effected or controlled by said bell-crank levers 1, 2, and 3, which are operated by the cam $c^7$, and that the coöperative relation of said extension $t^3$ and bell-crank levers 1, 2, and 3 shall be determined by the rotatable cam $u$. In operating the day-printing wheel thirty-one successive steps to present its thirty-one printing characters successively to printing position to correspond to a month having thirty-one days the extension $t^3$ of the bell-crank lever $t$ will occupy its outermost position and will be out of coöperative relation with the arms 11, 12, and 13 of all of said bell-crank levers, and the cam $b^7$, which moves in unison with the hour-wheel, will engage and operate the pallet $c^5$ once for each complete revolution of said hour-wheel and will thereby advance the day-printing wheel $c$ intermittingly thirty-one successive steps, and as the pallet $c^5$ is operated by the cam $c^7$ to advance the day-wheel $c$ to bring its twenty-eighth printing character out of printing position and to bring the twenty-ninth printing character into printing position the cam $c^7$, which moves in unison with said day-printing wheel $c$, will engage and operate the bell-crank lever 3, and as the pallet $c^5$ is again operated by said cam $b^7$ the cam $c^7$ will engage and operate the bell-crank lever 2, and as the pallet $c^5$ is again operated by said cam $b^7$ the cam $c^7$ will engage and operate the bell-crank lever 1; but during the successive operations of said bell-crank levers 3, 2, and 1 the said levers will not in turn operate the extension $t^3$, because the said extension is removed from the path of movement or engagement of the arms 11, 12, and 13 of said bell-crank levers. It will therefore be seen that the day-printing wheel $c$ will successively present its thirty-one printing characters to printing position for use. When it is desired to present but thirty printing characters to printing position to correspond to a month having thirty days, the extension $t^3$ will be moved by the cam $u$ into position to coöperate with the arm 11 of the bell-crank lever 1, and with the parts in this position the day-printing wheel $c$ will be intermittingly operated, as above described, by the cam $b^7$ operating its pallet $c^5$ until the thirtieth printing character is presented to printing position, and then as the cam $b^7$ again operates the pallet $c^5$ to advance the day-printing wheel $c$ one more step and carry the thirtieth printing character out of printing position and to bring the thirty-first printing character into position the cam $c^7$ will operate the bell-crank lever 1 and its arm 11 will engage and depress the extension $t^3$ and spring carried by it, and the latter by its engagement with the pallet $c^5$ will rock said pallet and cause the day-printing wheel $c$ to immediately advance another step and carry the thirty-first printing character, which has just been brought into printing position, out of printing position and bring the first printing character into printing position. The thirty-first printing character will thus not remain in printing position, and consequently but thirty printing characters will have been presented to printing position for use. When the extension $t^3$ is moved into coöperative relation with two or all of the arms of said bell-crank levers 1, 2, and 3, the operations above described will be carried out and the pallet $c^5$ will be vibrated two or three times in quick succession by the extension $t^3$ and twenty-nine or twenty-eight printing characters allowed to occupy and remain in printing position for use, the other printing characters being rapidly moved out of printing position— that is to say, assuming the extension $t^3$ to be in engagement with all three bell-crank levers, as the cam $b^7$ rocks the pallet $c^5$ and causes the cam $c^7$ to engage the bell-crank lever 3 the said bell-crank lever will in turn depress the extension $t^3$ and will operate the pallet $c^5$ to cause the cam $c^7$ to operate the bell-crank lever 2, which in turn again depresses the extension $t^3$, which again will operate the pallet $c^5$ and cause the cam $c^7$ to engage the bell-crank lever 1, which in turn again depresses the extension $t^3$ and operates the pallet $c^5$ to advance the day-printing wheel $c$ and bring the first printing character into printing position.

The year-printing wheel $e$ (see dotted lines, Figs. 15, 16, 19, and 20) is placed loosely upon the sleeve $d'$ of the month-printing wheel $d$, and it has secured to one side or face a toothed or notched wheel $e^3$, which is engaged and operated by a pallet $e^5$, (see Fig. 21,) mounted loosely on the rod or bar $a^4$, and one toothed end of said pallet has attached to it a pull-spring $a^6$, which draws up said toothed end of the pallet and forces the other toothed end of said pallet into engagement with the notched wheel $e^3$. The cam $d^7$ of the month-wheel $d$ engages a projection 100 on one toothed end of said pallet $e^5$ and moves said pallet so as to throw its other toothed end into engagement with the notched wheel $e^3$, and said toothed end is so shaped as to move said notched wheel $e^3$ a short distance when engaging it, and as soon as said cam disengages the other toothed end of the pallet the spring will operate to force said disengaged toothed end into engagement with the notched wheel, withdrawing its other toothed end, and said toothed end thus forced into engagement with the notched wheel is so shaped as to advance said notched wheel further, and thereby complete a single step of said year-wheel $e$ for each complete vibration of the pallet. A retaining-pawl $x'$ is fixed to said pallet, which engages the year-wheel $e$ and serves to hold it at rest, and said pawl is operated in unison with the pallet $e^5$.

The cam $d^7$ is made double-ended—i. e., it has a cam-surface at each end, so as to operate the year-printing-wheel at every half-revolution of the month-wheel, which latter, as stated, has printing characters for twenty-four months.

The cam $u$ is journaled loosely upon a stud $u'$, projecting from the frame of the machine, and has fixed thereto a pinion $u^2$. The periphery of the said cam $u$ is divided into twelve divisions (see Fig. 22) for the twelve months of the year, and each division of the cam, with the exception of that particular division which is brought into operative position during the month of February, is shaped so as to engage the bell-crank lever $t$ and hold it in different positions in order that its extension $t^3$ may occupy different positions relative to the bell-crank levers 1, 2, and 3, said extension being removed from engagement with said levers for months having thirty-one days and engaging the lever 3 for months having thirty days and engaging the levers 3 and 2 for months having twenty-nine days and engaging the levers 3, 2, and 1 for months having twenty-eight days. That division of the cam $u$ which is allotted to the month of February is cut away and a movable slide $u^4$ (see Figs. 22 and 23) is located in said cut-away portion, it having a slot $u^5$, adapting it to be placed upon the stud $u'$ and enabling the slide to be moved thereon diametrically of the cam $u$. The slide $u^4$, which is movable diametrically of the cam $u$, has two positions, determined by means to be hereinafter described, and when in one position the bell-crank lever $t$ bearing upon or engaging it will be held so that its extension $t^3$ will engage or coöperate with the two bell-crank levers 3 and 2 for a month having twenty-nine days, and when said slide is moved into its other position the bell-crank lever $t$ engaging it will be held so that its extension $t^3$ will engage or coöperate with all three of the bell-crank levers 3, 2, and 1 for a month having twenty-eight days. The pinion $u^2$ meshes with a gear $u^3$, fixed to the sleeve of the month-wheel $d$, (see Figs. 2, 15, and 16,) and said month-wheel has on its periphery twenty-four printing characters, enough for two years, and the relative sizes of pinions $u^2$ and gear $u^3$ are such that the cam $u$ makes two revolutions for each revolution of the month-wheel $d$. The year-printing wheel $e$ is in this instance provided with twenty-four year-printing characters, and the said wheel has fixed thereto a cam $u^6$, which is adapted to engage and move a lever $u^7$, that is loosely mounted on the cross-bar $a^4$. The lever $u^7$ is provided with an arm $u^8$, which is brought into the path of engagement of the slide $u^4$ at predetermined times by the cam $u^6$ to project said slide more or less radially from the rotatable cam $u$, upon which it is mounted. The cam $u^6$, fixed to the year-wheel $e$, is formed or provided with projections $u^9$, which operate through the medium of lever $u^7$ to move the arm $u^8$ in a direction to project the slide $u^4$ upon the occasion of leap-years, at which times the day-wheel will be operated through the medium of bell-crank levers 3 and 2 and the extension $t^3$, so as to present twenty-nine days in the month of February. The cam $u^6$ is also so formed as to permit of the slide $u^4$ retaining its retracted position upon the occasion of those years which are not leap-years and century-years which follow four years after the previous leap-years, but which are not leap-years, at which times the extension $t^3$ will be permitted to assume operative relation with all of the bell-crank levers 1, 2, and 3.

Referring to Fig. 28, the printing-magnet is shown at $f^4$, and the type-wheel magnet is shown at $r$, and for simplicity of construction the cores of said magnets are secured to a single intermediate yoke $r^{50}$. $r^{60}$ represents a circuit-closer operated by a clock for closing the circuit of the type-wheel magnet $r$ at regular intervals of time, and $r^{70}$ represents a circuit-closer for closing the circuit of the printing-magnet $f^4$. To prevent sparking, I have arranged a resistance-coil $r^{80}$ in a short circuit between the coils of each of said electromagnets.

I claim—

1. In a time-stamp, the combination of a number of printing-wheels, releasing devices therefor, a spring-impelled shaft, a number of driving-gears mounted loosely on said shaft and adapted to operate said printing-wheels, and devices independently connecting said gears with said shaft, substantially as described.

2. In a time-stamp, the combination of a number of printing-wheels, releasing devices therefor, a number of driving-gears for said printing-wheels, a spring-impelled shaft on which said driving-gears are mounted and by which they are independently operated when their respective printing-wheels are released, substantially as described.

3. In a time-stamp, the combination of a number of printing-wheels, an escape-wheel and pallet for each printing-wheel, and pallet-operating devices, and means for moving the said wheels forward consisting of a rotatable shaft, an impelling-spring therefor, and means operatively connecting said rotating shaft with each of said printing-wheels independently, substantially as described.

4. In a time-stamp, the combination of a number of printing-wheels, an escape-wheel and pallet for each of said printing-wheels, periodically-operated releasing devices for said pallets, a rotating shaft, an impelling-spring therefor, and devices operatively connecting each of the printing-wheels with said rotating shaft whereby they may be rotated independently when released, substantially as described.

5. In a time-stamp, the combination of a number of printing-wheels, escape-wheels and pallets therefor, and pallet-operating cams moving in unison with said printing-wheels for operating the pallets of the adjacent printing-wheels, a periodically-operated releasing device for one of said cam-bearing printing-wheels, and means for moving said printing-wheels forward consisting of a rotatable driving-shaft, main actuating-spring therefor and means operatively connecting said rotating shaft with each of said printing-wheels independently, substantially as described.

6. The combination with a spring-actuated printing-wheel, its escape-wheel and pallet having an arm connected thereto provided with a laterally-projecting stud, a pivoted arm formed with a shoulder adapted to be moved out of and back into the path of movement of said stud, a spring-pressed finger pivoted to said arm having its end projecting slightly beyond said shoulder, and an electromagnet and armature for operating said arm, substantially as described.

7. In a time-stamp, the combination of a spring-actuated printing-wheel, an escape-wheel moved by it, a pallet for said escape-wheel, and an arm secured to and operated by said pallet, a releasing-lever for it, and means for periodically operating said releasing-lever, substantially as described.

8. In a time-stamp, the combination of a spring-actuated printing-wheel, escape-wheel moved by it, a pallet for said escape-wheel, an arm secured to and operated by said pallet, a stud projecting from said arm, a releasing-lever formed with a shoulder adapted to be engaged by said stud, a spring-pressed finger pivotally mounted on said releasing-lever, and an electromagnet for operating said releasing-lever, substantially as described.

9. In a time-stamp, the combination of a series of printing-wheels one of which has on it thirty-one printing characters, means for operating it step by step to present the printing characters thereon successively to printing position, an auxiliary device for controlling the operating mechanism for said printing-wheel, and automatic means for controlling the operation of said auxiliary device, having as a coöperative part of it a rotating cam having twelve divisions corresponding to the twelve months of the year, means for adjusting one of said divisions and a controlling-lever operated by said cam, substantially as described.

10. In a time-stamp, the combination of a series of printing-wheels, one of which has on it thirty-one printing characters for the days of the month, and one of which has on it printing characters representing the months of the year, means for operating said printing-wheels step by step, an auxiliary device for controlling the mechanism for operating said day-printing wheel, which is operated by said day-printing wheel, and means for controlling the operation of said auxiliary device which is operated by said month-printing wheel, substantially as described.

11. In a time-stamp, the combination of a series of printing-wheels comprising a day, a month and a year printing wheel, means for operating said wheels, an auxiliary device for controlling the mechanism for operating the day-printing wheel operated by said day-printing wheel and controlled by said month and year wheels, whereby to automatically provide for variations in the number of days in the different months of a number of years, substantially as described.

12. In a time-stamp, the combination of a day-printing wheel, escape-wheel and pallet therefor, means for operating said pallet, a pivoted lever operatively connected with said pallet, pivoted bell-crank levers of different lengths, means for moving said pivoted lever into and out of coöperative relation with one or more of said bell-crank levers, and means for successively operating said bell-crank levers, substantially as described.

13. In a time-stamp, the combination of a series of printing-wheels, escape-wheels and pallets therefor, and pallet-operating cams moving in unison with the printing-wheels for operating the pallet of adjacent wheels, means operatively connected with and controlled by the month and year wheels operated by the cam of the day-wheel for automatically presenting a different number of printing characters of the day-wheel at the printing-point to correspond with the printing character presented by the month and year wheels, substantially as described.

14. In a time-stamp, the combination of the day-printing wheel, actuating device therefor, a bell-crank lever $t$, having an extension $t^3$ pivoted thereto, and operatively connected with the actuating device of said day-printing wheel, and means for controlling and operating said bell-crank lever and its extension, substantially as described.

15. In a time-stamp, the combination of the day-printing wheel, actuating device therefor, the bell-crank lever $t$ having an extension $t^5$ pivoted thereto, and operatively connected with the releasing device of said day-printing wheel, means for moving said bell-crank lever $t$ on its pivot, and devices operated by said day-printing wheel for operating the extension $t^8$, substantially as described.

16. In a time-stamp, the combination of the day-printing wheel, actuating device therefor, the bell-crank lever $t$ having an extension $t^3$ pivoted thereto, and operatively connected with the actuating device of said day-printing wheel, three bell-crank levers having arms of different lengths adapted to engage said extension $t^3$, a cam moving in unison with said day-printing wheel, for successively operating said bell-crank levers, and means for moving the extension of the lever $t$ into and out of coöperative relation with the arms of said bell-crank levers, substantially as described.

In testimony whereof I have signed my name to this specification in the presence of two subscribing witnesses.

NATHAN H. SUREN.

Witnesses:
 B. J. NOYES,
 ARTHUR F. RANDALL.